United States Patent
Ahluwalia et al.

(10) Patent No.: US 8,694,810 B2
(45) Date of Patent: Apr. 8, 2014

(54) SERVER POWER MANAGEMENT WITH AUTOMATICALLY-EXPIRING SERVER POWER ALLOCATIONS

(75) Inventors: Vikas Ahluwalia, Redmond, WA (US); Scott A. Piper, Bothell, WA (US); Jeffery J. Van Heuklon, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/887,661

(22) Filed: Sep. 22, 2010

(65) Prior Publication Data
US 2012/0072745 A1    Mar. 22, 2012

(51) Int. Cl.
G06F 1/26    (2006.01)
(52) U.S. Cl.
USPC ............................ 713/320; 713/300; 713/310
(58) Field of Classification Search
USPC ......................................... 713/300, 310, 320
See application file for complete search history.

(56) References Cited

U.S. PATENT DOCUMENTS

| | | | |
|---|---|---|---|
| 7,493,503 B2 | 2/2009 | Aldereguia | |
| 7,650,517 B2 | 1/2010 | Hughes | |
| 7,650,520 B2 | 1/2010 | Shaffer | |
| 7,702,931 B2 | 4/2010 | Goodrum | |
| 7,908,495 B2 * | 3/2011 | Diab et al. | 713/300 |
| 8,301,919 B2 * | 10/2012 | Diab et al. | 713/300 |
| 2004/0088414 A1 | 5/2004 | Flynn | |
| 2005/0283624 A1 * | 12/2005 | Kumar et al. | 713/300 |
| 2007/0079156 A1 * | 4/2007 | Fujimoto | 713/300 |
| 2007/0186121 A1 | 8/2007 | Yasuo | |
| 2007/0300083 A1 * | 12/2007 | Goodrum et al. | 713/300 |
| 2009/0106571 A1 | 4/2009 | Low | |
| 2009/0125737 A1 | 5/2009 | Brey | |
| 2010/0037070 A1 | 2/2010 | Brumley | |
| 2011/0010566 A1 * | 1/2011 | Bandholz et al. | 713/300 |
| 2011/0029787 A1 * | 2/2011 | Day et al. | 713/300 |
| 2011/0257802 A1 * | 10/2011 | Bieswanger et al. | 700/291 |
| 2012/0036377 A1 * | 2/2012 | Tolentino | 713/310 |

\* cited by examiner

*Primary Examiner* — Kim Huynh
*Assistant Examiner* — Zahid Choudhury
(74) *Attorney, Agent, or Firm* — Katherine S. Brown; Jeffrey L. Streets

(57) ABSTRACT

One embodiment provides a power management method for servers in a data center. A group of servers is selected, and the total power allocated to a group of servers is limited to within a group power budget. A separate server power allocation is individually requested for each of a plurality of the servers. Within the constraints of the group power budget, the requested server power allocations are selectively granted for a specified magnitude and duration. The granted server power allocations are also selectively renewed, either automatically or upon request of the servers. Each server that has not received a renewed server power allocation from a group power management entity upon the expiration of the specified duration automatically reduces its own power consumption, such as by the server powering itself off.

20 Claims, 6 Drawing Sheets

SERVER POWER MANAGEMENT WITH AUTOMATICALLY-EXPIRING SERVER POWER ALLOCATIONS

BACKGROUND

1. Field of the Invention

The present invention relates to power management in a computer system, and more particularly to managing power among a group of servers in a rack-mounted computer system.

2. Background of the Related Art

A datacenter is a facility having one or more racks of computer equipment housed in a computer room for convenient access by datacenter personnel. The computer room provides a controlled environment and infrastructure conducive to operating the computer equipment. For example, a computer room may provide electrical utilities with the capacity to power a large volume of rack-mounted computer equipment, and a cooling system capable of removing the correspondingly large quantity of heat generated by the rack-mounted computer equipment. The cooling system in many installations will include a particular arrangement of equipment racks into alternating hot aisles and cold aisles, and a computer room air conditioner ("CRAC") capable of maintaining a room temperature well below the temperature limits of the computer equipment.

Each rack may support one or more equipment chassis in a stacked relationship. For example, a rack mountable multi-server chassis typically includes multiple server bays having standardized dimensions, so that each server bay can receive a server of corresponding size. The server bays may be closely spaced and aligned to consolidate the servers in a compact, high-density arrangement. A multi-server chassis will also typically include support modules providing shared resources to the servers, such as a power supply module providing electrical power to the servers, a blower module for moving air through the servers, a network module providing network connectivity to the servers, and a supervisory controller for managing power and other chassis resources. Using support modules to provide shared resources allows the individual servers and the chassis receiving the servers to be made smaller and more compact.

Power management is a consideration in the design and development of computer systems. Continual efforts are made to improve the efficiency of today's computer systems. For example, a power cap for a server may be communicated to a server from an external agent, such as IBM Systems Director® (a registered trademark of International Business Machines Corporation of Armonk, N.Y.). The server then dynamically adjusts its power consumption to avoid exceeding the power cap, such as by throttling system components. Similar techniques can be applied to limiting the power consumption of a group of servers, such as a stand-alone rack of servers or blade servers in a shared chassis.

BRIEF SUMMARY

One embodiment of the present invention provides a method of managing power to a group of servers by a group power management entity. The total power allocated by the group power management entity to a group of servers is limited to within a group power budget. In each server, a server power allocation is requested for that server from the group power management entity. In the group power management entity, each requested server power allocation that is within the group power budget is granted for a specified magnitude and duration. In the group power management entity, the granted server power allocations are selectively renewed. In each server, power to that server is automatically reduced if that server has not received a renewed server power allocation from the group power management entity by the expiration of the specified duration.

Another embodiment of the invention provides a computer system including a group of servers and a group power management entity. Each server includes a local controller having control logic for controlling power to the server. The group power management entity is in communication with the servers. The group power management entity includes control logic for allocating power to the group within a group power budget, including control logic for selectively granting a server power allocation to each server with a specified magnitude and duration, and for selectively renewing the granted server power allocations. The local controller of each server includes control logic for requesting the server power allocation to that server, limiting the power consumption of that server to any server power allocation granted to that server, and for automatically reducing the power consumption of that server if the local controller has not received a renewed server power allocation from the group power management entity upon expiration of the specified duration.

DETAILED DESCRIPTION

Embodiments of the present invention include a system and method for managing power to servers in a datacenter. In one embodiment, one or more groups of servers may be defined by a user. Servers may be dynamically added or removed from a group in response to user input. A group power budget may be assigned to each group by the user. Then, a power allocation is individually, dynamically negotiated between each server and a global power management entity (PME). As part of the negotiation, the server may request a server power allocation from the power management entity. The server may request a specific magnitude and duration of power allocation with the request. Alternatively, the server may make an open-ended request for a server power allocation, in response to which the power management entity may inspect the server to determine an appropriate magnitude and duration. The group power management entity selectively renews the power allocations or grants new power allocations. A server in the group will automatically reduce its own power upon expiration of its current power allocation if the power allocation has not been renewed, such as if the power management entity has not granted a renewal or because the group power management entity is temporarily unable to communicate with the server to grant the renewal.

Figure 1:
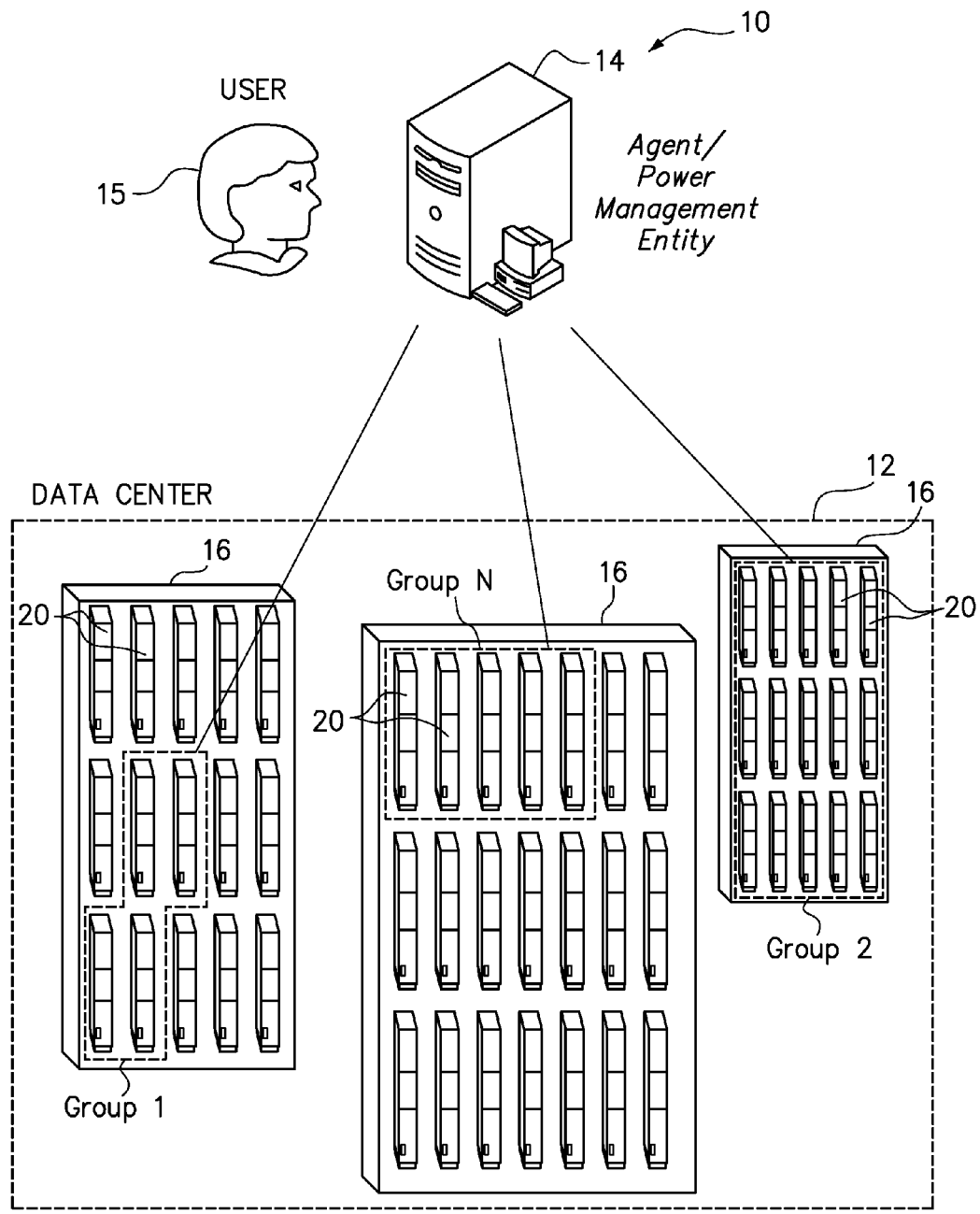
FIG. 1 is a schematic diagram of a computer system to be power managed according to an embodiment of the invention.

FIG. 1 is a schematic diagram of a computer system 10 to be power managed according to an embodiment of the invention. The computer system 10 includes a plurality of servers 20 in a data center 12 and a power management entity 14 for managing the allocation of power to the servers 20. The servers 20 are typically mounted in racks 16. Each rack 16 may hold one or more rack-mountable chassis (not shown) as generally understood in the art, with each chassis receiving a plurality of servers 20. The servers 20 may also be stand-alone servers each having on-board power and cooling. More typically, the servers 20 are blade-type servers that share resources such as power, cooling, and network connectivity provided by support modules in a chassis. In order to manage power to the servers 20, the power management entity 14 is in communication with the servers 20, such as through a network. Thus, signal lines for communication between the power management entity 14 and the servers 20 may physically terminate at the servers 20. However, the power management entity 14 is preferably external to the servers, such that the power management entity 14 includes power management hardware and power management control logic physically separated from the servers 20. This physical separation of the power management entity 14 from the servers 20 allows for remote monitoring and control of the servers 20 in the datacenter 12. In this embodiment, the power management entity 14 is external to the datacenter 12, itself, allowing the servers 20 to be monitored from outside of the datacenter 12. In another embodiment, the power management entity 14 may alternately reside inside the datacenter 12 but still external to the servers 20 that are being power managed, allowing the servers 20 to be monitored from somewhere inside the datacenter 12. One or more components of the power management entity 14 may reside in a rack 16, such as on a chassis-mounted power management module that is in close proximity to the servers 20 but still external to the servers 20. The power management entity 14 may include hardware and/or software combined with an existing power management suite, such as with IBM® Systems Director.

The external power management entity 14 acts as an agent to a user 15, who is typically a datacenter administrator, by managing power to the servers 20 on the behalf of the user 15. The user 15 can utilize a user interface included with the power management entity 14 to create a group of servers 20 to be power managed by identifying selected servers to be included in the group. Example groups that the user 15 may select are labeled in FIG. 1 from Group 1 to Group N (delineated with dashed lines). Each group may consist of any selected subset of the servers 20. A group typically includes a plurality of servers 20, although a group may include as few as a single server, if desired. A group may comprise servers 20 from anywhere in the datacenter 12, and not necessarily servers immediately adjacent to one another. Thus, a group may consist of servers 12 from more than one chassis or even more than one rack. Of the example groups illustrated in FIG. 1, Group 1 includes four servers 20 taken from two different rows of a first rack 16. Group 2 includes all of the servers of another rack 16. Group N includes five servers taken from one row of a third rack 16. The user 15 may input group parameters, such as a group power budget to be allocated among the servers 20 of each group. According to further various methods discussed herein, the power management entity 14 can manage power to the selected groups of servers 20 within the constraints of the group power budget and other user-input group parameters.

Figure 2:
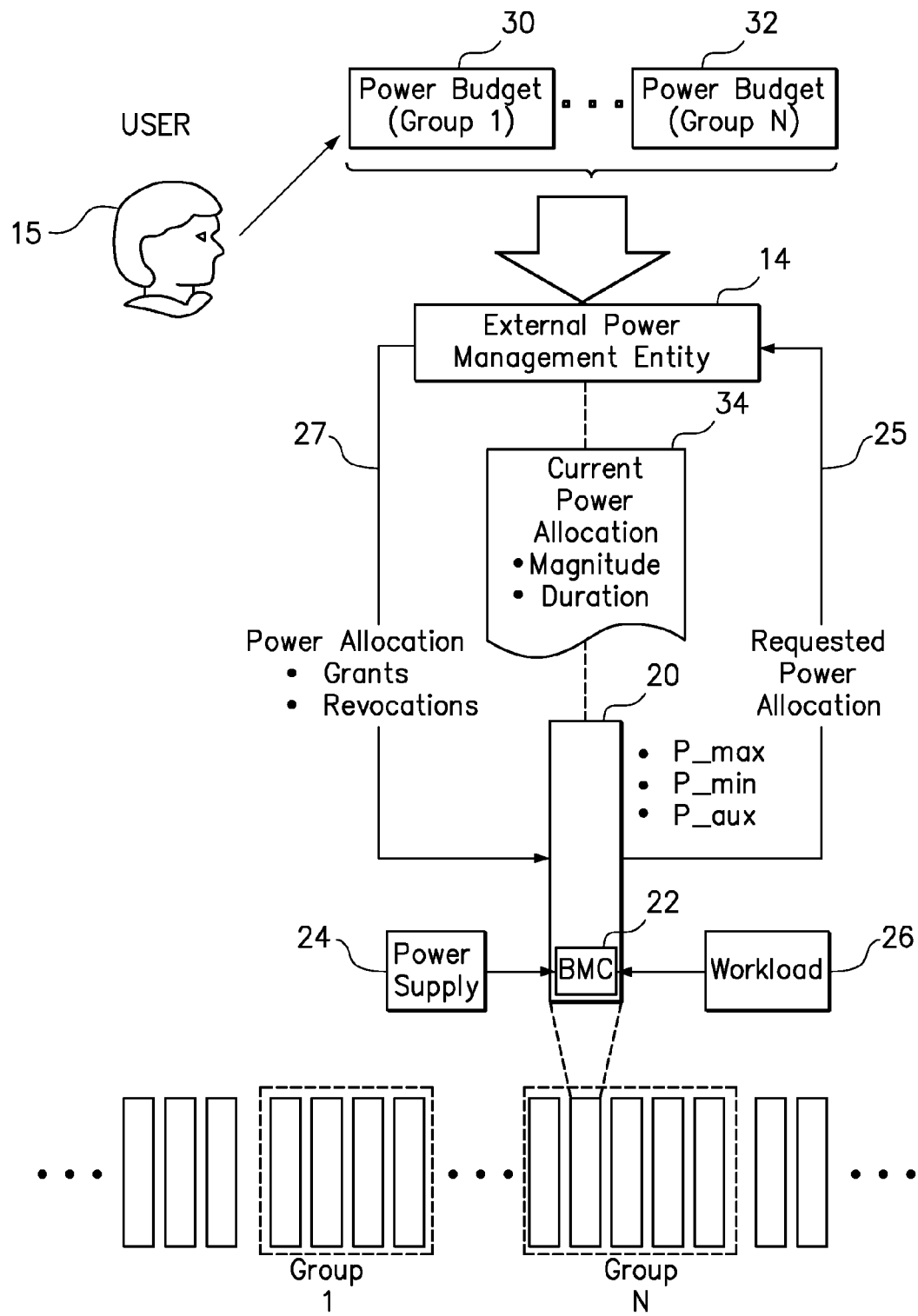
FIG. 2 is a schematic diagram further detailing the computer system of FIG. 1 implementing a method for managing power to a group of servers.

FIG. 2 is a schematic diagram further detailing the computer system 10 of FIG. 1 being used to implement a method for managing power to a group of servers. The user 15 may select any number "N" groups from among the available servers 20 in the datacenter. Groups are individually labeled in the figure from a first group ("Group 1") to an Nth group ("Group N"). The user inputs a power budget into the power management entity 14 for each group, from a first power budget 30 for Group 1 to an Nth power budget 32 for Group N. The total power available for allocation to the servers 20 in each group is limited by the group power budget for that group. The power management entity 14 is not required to apportion all of the power in the power budget, such that at any given moment some amount of power in the group power budget may remain un-apportioned.

A workload 26 may be dynamically provisioned to the server 20. The workload 26 may include a set of data processing tasks or other computing assignments to be handled by the server 20. Any number of workload units may be run on a computer system. One example of a workload unit used in the art is a workload "client," although a workload unit may also be a "job," "application," or other workload unit known in the art. Exemplary workload metrics include, but are not limited to, CPU utilization, network I/O traffic, disk I/O traffic, and memory utilization.

One server from Group N is enlarged and further detailed in the view of FIG. 2. The illustrated server 20 includes a local controller 22 and a power supply 24. The power supply 24 supplies electrical power to the server 20, which the server 20 consumes in the process of performing the workload 26. The amount of power and the duration that this amount of power is needed is directly affected by the workload 26. The local controller 22 may include a service processor, such as a baseboard management controller ("BMC"), configured for monitoring the real-time power consumption of the server 20 and dynamically adjusting the power consumption of the server. One method for adjusting the power consumption of the server 20 is to selectively throttle components of the server 20, such as processors or memory. Another method for adjusting the power consumption of the server 20 is to selectively switch between discrete power states of the components of the server 20. The power consumption of the server 20 may also be adjusted by selectively invoking a reduced power state of the server 20, such as a hibernation or sleep state, or by powering off the server 20. Any combination of these techniques may be used to enforce an amount of power allocated to the server 20 by the power management entity 14. In this embodiment, the server 20 includes at least three power states, which, in decreasing order of magnitude, consist of a powered-on and unthrottled power state having a power consumption of "P_max", a powered-on and fully-throttled power state having a power consumption of "P_min", and a powered-off power state having a power consumption of "P_aux". In the powered-off state, each server 20 still consumes a relatively small but still non-zero amount of auxiliary power necessary to support certain subsystems, including the local controller (service processor or BMC). Thus, each server needs to be provided with at least P_aux from a power budget. However, this amount of power preferably does not count toward (i.e. is not subtracted from) the power budget for a group.

Each server 20 in the group negotiates a power allocation 34 with the power management entity 14. A current power allocation 34 having a specific magnitude and duration has been agreed to between the server 20 (enlarged for detail from Group N) and the power management entity 14. The concept of a power lease may be used, by way of analogy, to illustrate the power allocation 34 agreed to between the power management entity 14 and the server 20. The power allocation is like a lease agreement because the magnitude and duration may be worked out in advance, and the server 20 and the power management entity 14, as "parties" to the lease, agree to operate by those terms unless otherwise agreed in the future. The terms of the server power allocation include a specific magnitude or amount of power that the server 20 may consume and a specific duration that the server 20 may consume that amount of power. The amount or magnitude of the power may be specified in Watts allocated from the group power budget to the server 20. The duration may be specified in seconds, minutes, or hours that the server 20 may consume the allocated amount of power. The power management entity grants (and the server 20 accepts) permission for the server 20 to consume power at the specified magnitude and for the specified duration. However, it should be noted that the server 20 consumes that amount of power from the power supply 24, and not from the power management entity 14.

The exchange between the server 20 and the power management entity is like a lease negotiation, the culmination of which will be that the power management entity 14 grants (or refuses to grant) a server power allocation to the server 20 having the agreed-upon magnitude and duration. The server 20 initiates the negotiation by requesting a server power allocation. The requested server power allocation may include a requested magnitude and duration. Alternatively, the requested server power allocation may be an open-ended request for power, the magnitude and duration of which will be subsequently negotiated. For example, the server 20 may make an open-ended request for power, and in a subsequent negotiation, the power management entity 14 may suggest the magnitude and duration of the power allocation for acceptance or rejection by the server 20. The requested server power allocation 25 is communicated from the server 20 to the power management entity 14. The magnitude, whether initially selected by the server 20 or by the power management entity 14, is typically a value between P_max and P_min. However, every server will be allocated at least P_aux (that preferably does not count toward the group power budget), even if a power allocation 34 is not granted, or after the expiration of the power allocation 34. Again, this amount of power P_aux preferably does not count toward the power budget for a group, because this amount of power must be provided to the server even when the server is powered off, and even when the server is not part of a recognized group.

In one implementation, the server 20 specifies a requested magnitude and duration with the requested server power allocation 25. The server 20 may initially request power in the amount of its largest power state P_max. If the power management entity 14 responds that there is insufficient unallocated power in the power budget, then the server 20 may reduce the requested magnitude, such as to some power level not less than the power state P_min. If insufficient power remains in the power budget to supply even the lowest power state requested by the server 20, then the server 20 may power itself off, whereupon it will consume power in the amount of P_aux. Each server in a group is provided power at least in the amount of P_aux (preferably without subtracting this amount from any power budget), since this amount of power may be necessary to support certain subsystems.

In another implementation, the server 20 may include a magnitude and duration in the request 25, wherein the requested magnitude and duration are computed by the server 20 as being sufficient for performing a defined workload 26. If insufficient power remains in the power budget to allocate power at the magnitude initially requested, the server 20 may make one or more subsequent request for a reduced magnitude of power that is within the power budget. Alternatively, if insufficient power remains in the power budget to allocate power at the magnitude initially requested, the power management entity 14 may respond with a counter-offer of a lower magnitude. The duration may be correspondingly selected so that the defined workload may be performed within the agreed-upon duration when performed at the agreed-upon magnitude.

In another embodiment, the power management entity 14 may inspect the server requesting the server power allocation to determine one or both of the server's available power states and the server's present workload so that the power management entity 14, itself, may determine the magnitude and duration. For example, in response to the requested server power allocation 25, the power management entity 14 may poll the server 20 to obtain the values of P_max, P_min, and P_aux. The power management entity 14 may then compare these values to the unallocated remaining portion of the power budget to determine if sufficient power remains in the power budget to allocate P_max or P_min. The power management entity 14 may select the largest value between P_max and P_min that is available within the power budget. If the unallocated portion of the power budget has a value of greater than P_min but less than P_max, the power management entity 14 may apportion all of the currently available power in the power budget to the server.

Upon conclusion of the negotiation, the power management entity 14 issues a granted server power allocation 27 containing the negotiated values of magnitude and duration to the server 12. The server 20 then uses the BMC 22 or other service processor or local controller to manage its own power consumption within the amount of power allocated to the server 20 by the power management entity 14 in the current power allocation 34. The BMC 22 may control power to the server 20 so that the server 20 consumes the full magnitude of power allocated to the server 20 in the current power allocation 34. However, the server 20 is not required to consume the full magnitude of power allocated to the server 20. The server 20 may selectively request a renewal for the current power allocation 34 or initiate a negotiation for a new power allocation at any time, either prior to expiration of the current power allocation 34, immediately in response to expiration of the current power allocation 34, or sometime after expiration of the current power allocation 34.

It can be difficult for a single external agent managing hundreds or thousands of servers in a datacenter to poll the servers frequently enough to keep power allocated effectively. Thus, in one novel aspect, the server 20 is configured to reduce its own power if the server 20 has not received a renewal of the current power allocation 34 or a new power allocation upon expiration of the current power allocation 34. One cause of the server 20 not receiving a renewal of the current power allocation 34 or a new power allocation upon expiration of the current power allocation 34 is that the server 20 fails to request a renewal or a new lease upon that expiration. Another cause of the server 20 not receiving a renewal of the current power allocation 34 or a new lease is that that server 20 has requested a renewal, but the power management entity 14 has not been able to contact the server 20 to confirm renewal, such as due to network congestion, a network failure, the power management entity not running (i.e., hosted on a system running Director that has been powered-off, or hosted on a chassis management module that has failed), the power management entity or server is unresponsive because of other workload, and so forth. Whatever the cause, if the lease expires without a renewal or a new lease, the server 20 reduces its own power under the control of the BMC 22, without any further input from the power management entity 14. The server 20 typically reduces its power by powering itself off, such that the server 20 would then only consume an amount of power equal to P_aux. The server 20 may then request a lease renewal or a new lease any time after the server 20 has reduced its own power. FIGS. 3-7 provide flowcharts illustrating examples of power management methods that may be performed by the computer system 10.

Figures 3, 4:
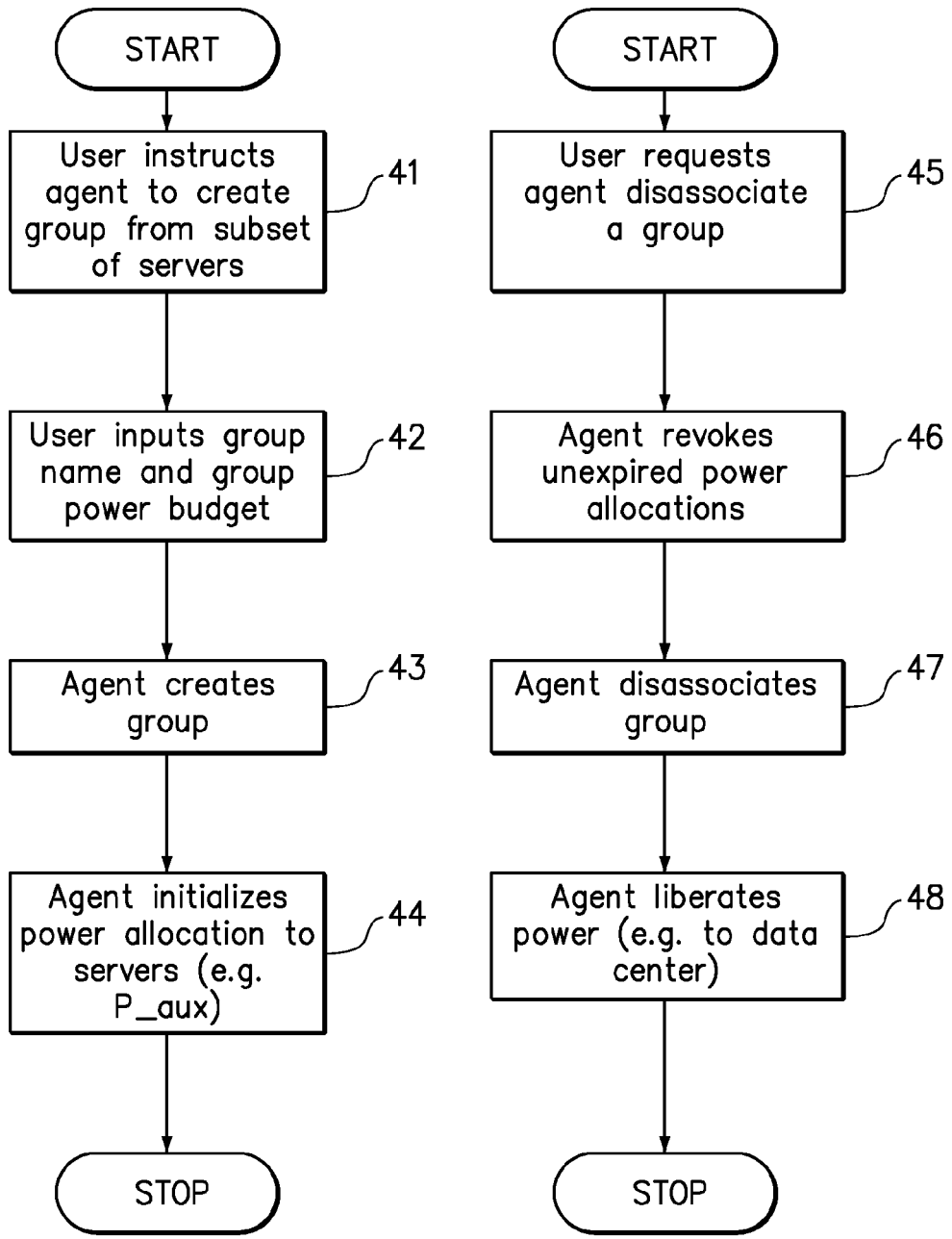
FIG. 3 is a flowchart illustrating the creation of a power-managed group of servers at the direction of a user.
FIG. 4 is a flowchart illustrating the disassociation of a power-managed group of servers at the direction of a user.

FIG. 3 is a flowchart illustrating the creation of a group of servers at the direction of a user. A group power management entity may act as an agent on behalf of the user to create a group and manage power to the group in response to user input. A user interface (UI) may be provided for the user to create the groups and input a power budget for each group. In step 41, the user selects a subset of servers in the datacenter and instructs the agent to create a group from the selected subset. The subset may include any one or more of the servers in the datacenter, including servers from more than one chassis or servers from more than one rack. In step 42, the user inputs a group name uniquely identifying the group created in step 41, along with a group power budget for the group. In step 43, the agent, at the user's direction, creates the group, associating the servers identified by the user and assigning the power budget and group name input by the user. In step 44, the agent initializes a server power allocation to the servers. Typically, the agent will inspect each server to determine P_aux and initialize each server by allocating power in the magnitude of P_aux. However, either the magnitude of P_aux does not count toward the power budget, or else the power budget is dynamically adjusted to provide at least P-aux for every server in a group. The servers may alternatively be configured to request a specific server power allocation of greater than P_aux upon initialization.

FIG. 4 is a flowchart illustrating the disassociation of a group of servers at the direction of a user. The user may choose to disassociate a group at any time, such as to liberate servers for subsequently creating a new group that includes one or more of the liberated servers. In step 45, the user requests that the agent disassociate a selected group. In step 46, the agent revokes any unexpired server power allocations to the servers. If any servers cannot be contacted, the agent may wait until the expiration of those server power allocations. In step 47, the agent then disassociates the group, so that the servers are available for forming new groups. In step 48, the agent liberates an amount of power to the datacenter that was previously allocated to the group as a group power budget.

Figure 5:
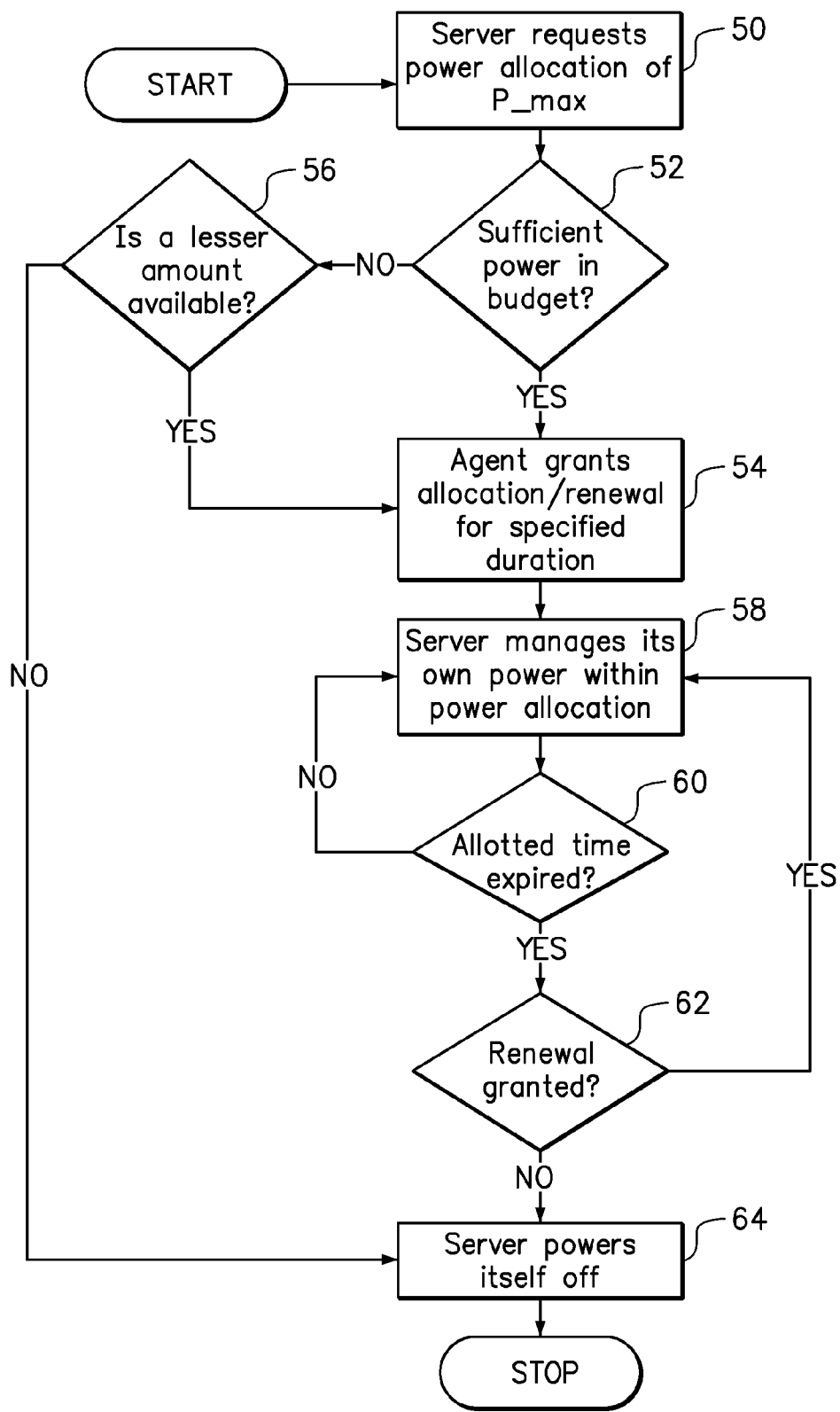
FIG. 5 is a flowchart illustrating a method of managing the amount of power provided to a group of servers.

FIG. 5 is a flowchart illustrating a method of managing power to a group created according to the flowchart of FIG. 3. The flowcharted method focuses on power management to any one server in the group, and each server in the group may be similarly power-managed according to the flowcharted method. In step 50, a server requests a server power allocation in the amount of its maximum, unthrottled power state P_max from a group power management entity. Conditional step 52 is to determine whether sufficient power remains in the power budget to grant the request. If sufficient power remains in the power budget to grant the request, then the agent grants the request for P_max in conditional step 54. The request is granted for a specified duration, which may be negotiated as discussed above with respect to FIG. 2. If sufficient power does not remain in the power budget to grant the request for P_max at conditional step 54, however, then conditional step 56 is to instead determine whether a lesser amount is available. The lesser amount sought may be any amount greater than the fully-throttled power state P_min. Any power magnitude of at least P_min may instead be granted in step 56. If not enough power remains in the power budget to grant at least P_min, then the server may power itself off according to step 64. When powered off, the server is still allocated an amount of power equal to P_aux, as necessary to run certain subsystems while the server is in the powered off state.

Returning to step 54, assuming the agent has granted an allocation of power of between P_min and P_max, the server will then manage its own power consumption according to step 58. The server controls its power consumption so that it does not exceed the magnitude of the server power allocation afforded in step 54. At any time, the server may request a renewal of its server power allocation. Conditional step 60 is to detect the expiration of the server power allocation under the terms of the current power allocation. Until the duration of the server power allocation has expired, the server continues to manage its own power within the power allocated by the power management entity according to step 58. When the server power allocation has expired, the server determines whether a renewal has been granted according to conditional step 62. If a renewal has been granted, then the server continues to manage its power within the server power allocation according to step 58. If a renewal has not been received upon expiration of the current power allocation, however, such as because the power management entity has not successfully communicated the renewal to the server or because the server has failed to request a renewal, then the server powers itself off according to step 64.

It should be recognized that the server requesting a power allocation may powered-off at the time that the request is made. This is possible because the baseboard management controller (BMC), which is responsible for requesting the power allocation, remains active and powered-on via auxiliary power even when the balance of the server is powered-off. In that case, the server will simply remain powered-off if an allocation is not granted. On the other hand, if an allocation is granted, then the server is free to power itself on.

An optional feature of a power-managed system and method according to an embodiment of the invention is to dynamically add or remove servers from a power-managed group. For example, a server might be removed from a group when the server requires service or maintenance. The server may be subsequently added to the group. In another embodiment, one or more servers may be added to a group if more datacenter power becomes available for budgeting. Alternatively, if power in the datacenter becomes less available, such as at off-peak hours, or for any other reason, servers may be removed from a group to reduce the size of the group.

Figure 6:
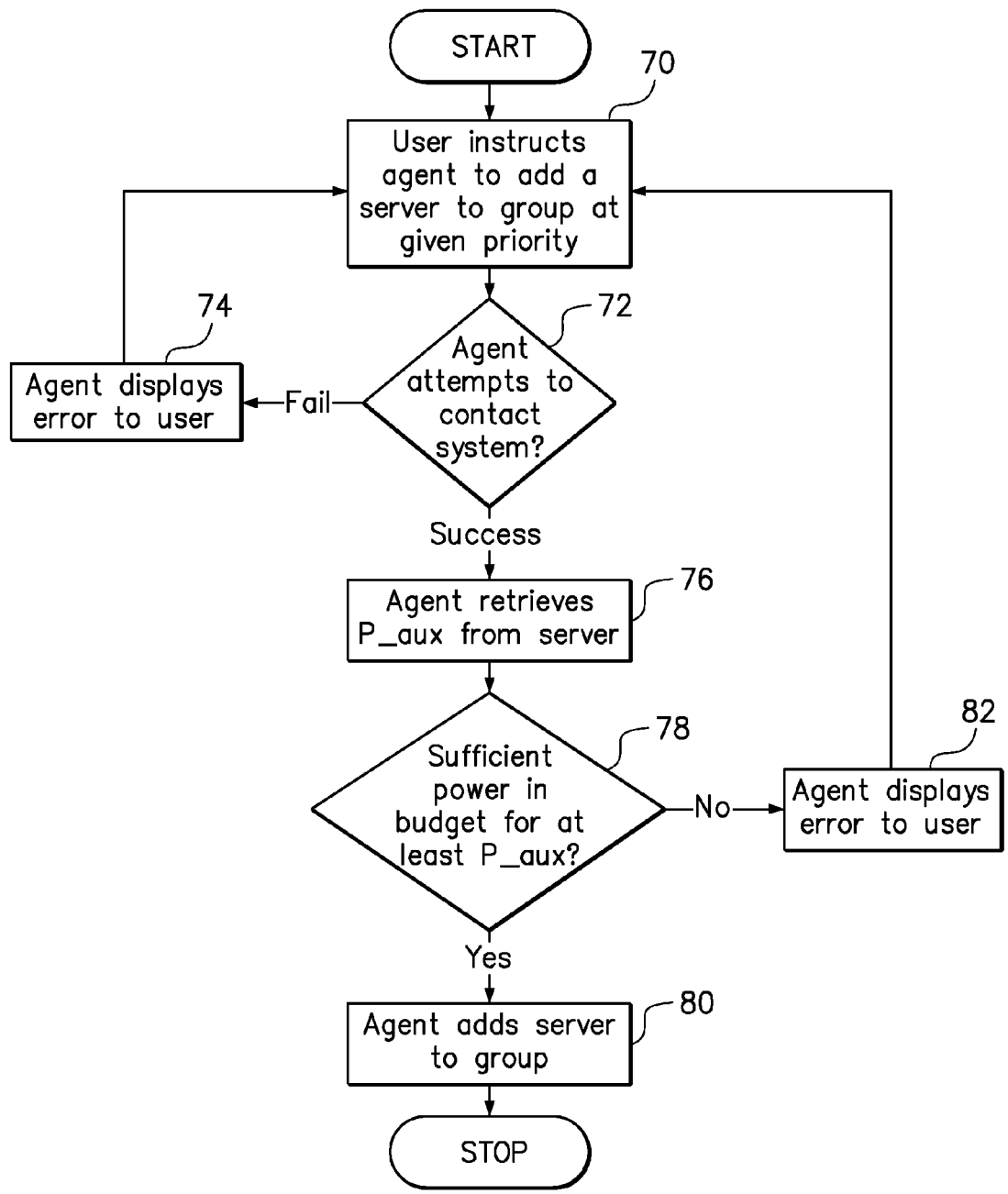
FIG. 6 is a flowchart of a method or subroutine for adding a server to a power-managed group.

FIG. 6 is a flowchart of a method or subroutine for adding a server to a power-managed group. In step 70, a user instructs the agent to add a server to a group. The server may specify a priority level for that server. Where more than one server in a group is simultaneously requesting a server power allocation, the priority level of each server may be used to determine which server receives the server power allocation first. Such an approach may be used, for example, in a scenario wherein the power budget is not sufficient to grant both requests. The priority level is thus a factor in determining whether a server is granted a server power allocation. The priority level may alternatively be just one factor in determining the magnitude of power to be granted during the negotiating of a power allocation, as discussed above.

In conditional step 72, the agent attempts to contact the system. If the agent is unable to contact the system, for example due to network congestion, a network failure, the power management entity not running, or the power management entity or server being unresponsive because of other workload, then the agent may display an error to the user on the UI according to step 74. If the agent is successful in contacting the server, then the agent retrieves the value of P_aux associated with that server in step 76. If sufficient power is available to grant at least this amount of power, according to conditional step 78, then the server is added to the group according to step 80. Whether the server will be granted a server power allocation is to be subsequently determined, such as according to the flowcharted method of FIG. 5. If sufficient power is not available to provide at least P_aux to the requesting server, then the agent displays an error to the user according to step 82, and the server is not added to the group, at least at that moment. If an amount of power is subsequently available in the power budget, then the agent may add the server to the group at a later time.

Figure 7:
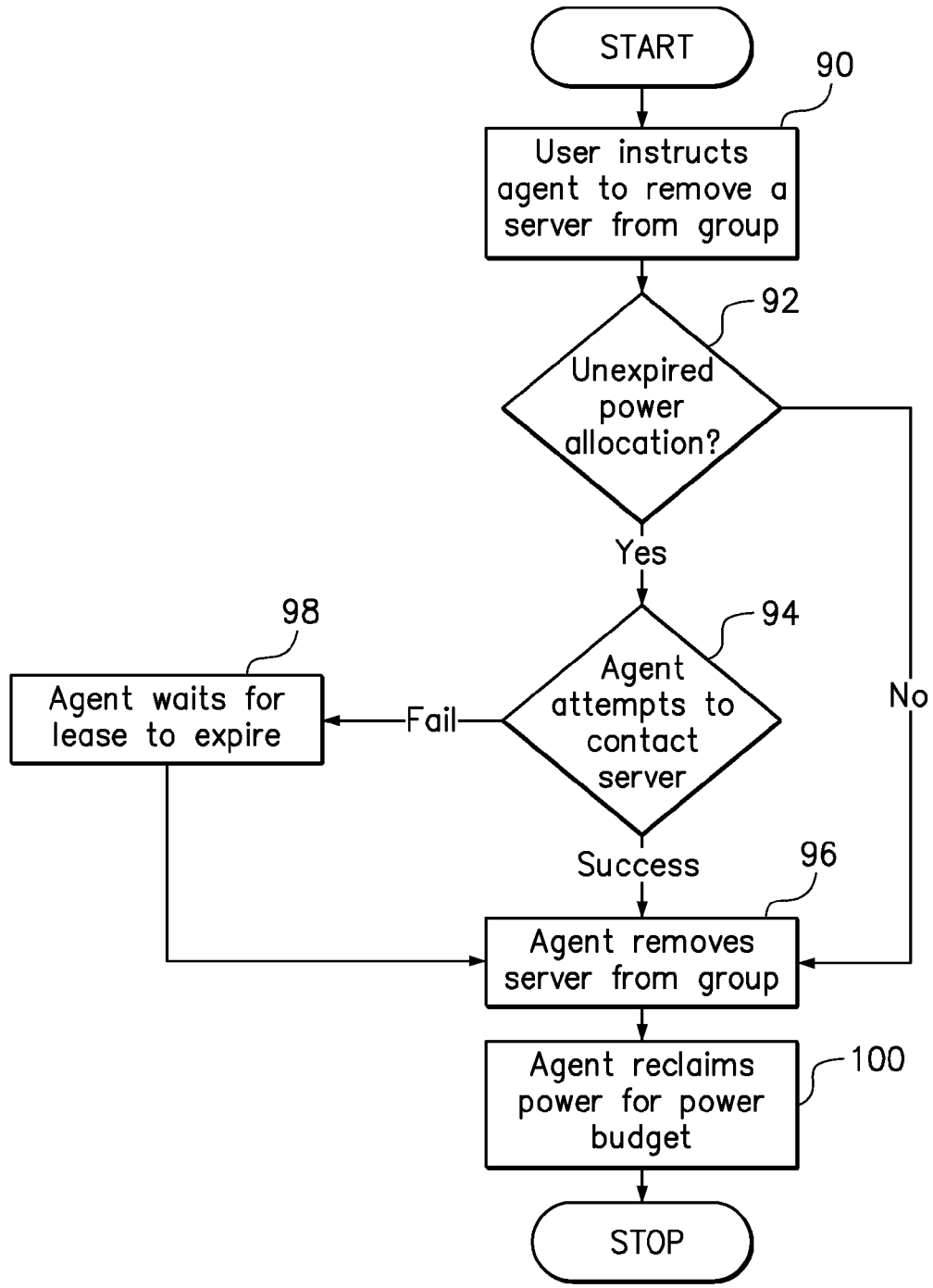
FIG. 7 is a flowchart of a method or subroutine for removing a server from a power-managed group.

FIG. 7 is a flowchart of a method or subroutine for removing a server from a power-managed group. In step 90, a user instructs the agent to remove a server from a specified group. In conditional step 92, the agent determines whether there is an unexpired server power allocation (lease) to the server. The agent may determine this without making contact with the server, since the agent was privy to the power allocation negotiation and has a record of all server power allocations. If there is an unexpired server power allocation, then the agent attempts to contact the server according to step 94. If the agent is successful in contacting the server, then the agent revokes the current power allocation, allowing the server the opportunity to safely power off, and removes the server from the group in step 96. The agent then reclaims any amount of power previously allocated to the server in excess of P_aux. If the agent is not successful in contacting the server, such as for any of the reasons specified above (e.g. network congestion or failure), then the agent may wait for the server power allocation/lease to expire according to step 98. When the lease expires, the server powers itself off (e.g. FIG. 5, step 64) and the agent then removes the server from the group in step 96. In step 100, the agent then reclaims any amount of power in excess of P_aux previously allocated to the server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing power to a group of servers by a group power management entity, comprising:
   the group power management entity limiting the total power allocated to a group of servers to within a group power budget;
   each server requesting a server power allocation for that server from the group power management entity;
   the group power management entity selectively granting each requested server power allocation that is within the group power budget for a specified magnitude and duration;
   the group power management entity selectively renewing the granted server power allocations; and
   each individual server automatically reducing the amount of power consumed by the individual server if that individual server has not received a subsequent server power allocation from the group power management entity by the expiration of the specified duration.

2. The method of claim 1, further comprising:
   the group power management entity attempting to communicate a renewal of a current power allocation to a selected server over a network prior to the expiration of the current power allocation of the selected server; and
   if the selected server does not receive the attempted communication of the renewed power allocation, waiting until the expiration of the current power allocation for the selected server to reduce its power consumption and for the group power management entity to re-allocating power from the selected server to another server.

3. The method of claim 1, further comprising:
   the group power management entity granting each requested server power allocation in the amount of the largest of a maximum un-throttled power consumption value, a fully-throttled power consumption value, or a standby power consumption value associated with the server for which the server power allocation is requested.

4. The method of claim 1, further comprising:
   each individual server monitoring the individual server's power consumption; and
   each individual server requesting a server power allocation with the magnitude selected according to the power consumption of the server requesting the server power allocation.

5. The method of claim 1, wherein the specified magnitude and duration is included with each requested server power allocation.

6. The method of claim 1, further comprising selecting the specified magnitude and duration of the requested server power allocation to achieve a defined set of tasks within the specified magnitude and duration.

7. The method of claim 1, wherein each renewed server power allocation is for the same duration as the server power allocation originally granted.

8. The method of claim 1, wherein the step of automatically reducing power comprises powering off the server.

9. The method of claim 1, further comprising:
   assigning a priority to each requested server power allocation; and
   the group power management entity granting the requested server power allocations according to the priority.

10. The method of claim 9, wherein granting the requested server power allocations according to the priority comprises granting one of two requested server power allocations having a higher priority and denying the other of the two requested server power allocations having a lower priority.

11. A computer system, comprising:
    a group of servers, each server including a local controller having control logic for controlling power to the server;
    a group power management entity in communication with the servers, the group power management entity including control logic for allocating power to the group within a group power budget, including control logic for selectively granting a server power allocation to each server with a specified magnitude and duration, and for selectively renewing the granted server power allocations; and
    wherein the local controller of each server includes control logic for requesting the server power allocation to that server, limiting the power consumption of that server to any server power allocation granted to that server, and for automatically reducing the power consumption of that server if the local controller has not received a renewed server power allocation from the group power management entity upon expiration of the specified duration.

12. The computer system of claim 11, wherein the control logic for automatically reducing the power consumption includes control logic for powering down the respective server.

13. The computer system of claim 10, wherein the local controller and group power management entity include control logic for negotiating the duration and magnitude of the server power allocation.

14. The computer system of claim 11, wherein each server comprises a plurality of selectable power states including a first power state wherein the server is powered on and not throttled, a second power state wherein the server is powered on and completely throttled, and a third power stated wherein the server is powered off but consumes a finite amount of power.

15. The computer system of claim 14, wherein the group power management entity is configured for polling each server to determine the selectable power states and to automatically allocate power in the amount of the highest power state that is within the power remaining in the group power budget when the requested server power allocation is received by the group power management entity.

16. The computer system of claim 11, wherein each local controller includes control logic for requesting the server power allocation with a magnitude selected according to the power consumption of the respective server.

17. A computer program product including computer usable program code embodied on a non-transitory computer readable storage medium, the computer program product comprising:
    computer usable program code executable by a group power management entity for limiting the total power allocated by the group power management entity to a group of servers to within a group power budget;
    computer usable program code executable by each server for requesting a server power allocation for that server from the group power management entity;
    computer usable program code executable by the group power management entity for granting each requested server power allocation that is within the group power budget for a specified magnitude and duration;
    computer usable program code executable by the group power management entity for selectively renewing the granted server power allocations; and
    computer usable program code executable by each server for automatically reducing power to that server if that server has not received a renewed server power allocation from the group power management entity by the expiration of the specified duration.

18. The computer program product of claim 17, further comprising:
    computer usable program code executable by the group power management entity for granting each requested server power allocation in the amount of the largest of a maximum un-throttled power consumption value, a fully-throttled power consumption value, and a standby power consumption value associated with the server for which the server power allocation is requested.

19. The computer program product of claim 17, further comprising:
    computer usable program code for monitoring a power consumption of each server; and
    computer usable program code for requesting each server power allocation with the magnitude selected according to the power consumption of the server requesting the server power allocation.

20. The computer program product of claim 17, wherein the computer usable program code executable by each server for requesting a server power allocation for that server from the group power management entity includes computer usable program code for specifying the magnitude and duration included with the requested server power allocation.

* * * * *